Sept. 29, 1964     R. L. LIEBERMAN     3,150,689
FLUID PULSATION DAMPENING APPARATUS
Filed June 18, 1963
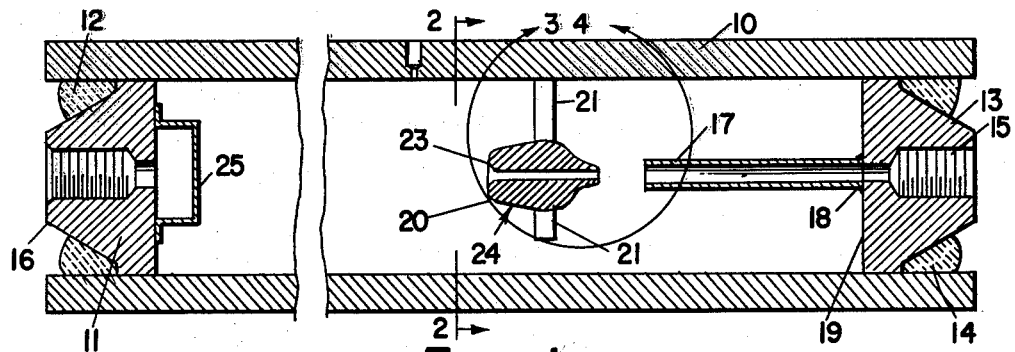
FIG.I.
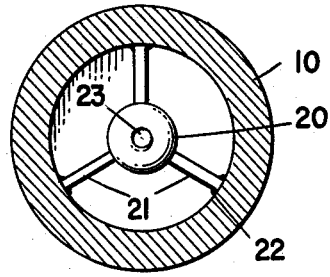
FIG.2.
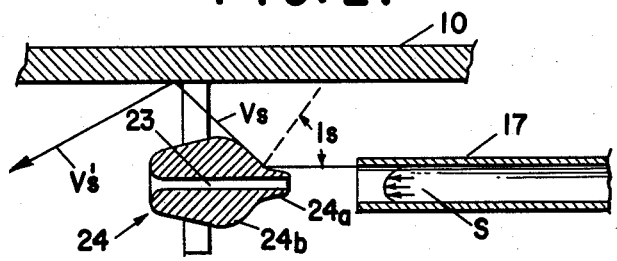
FIG.3
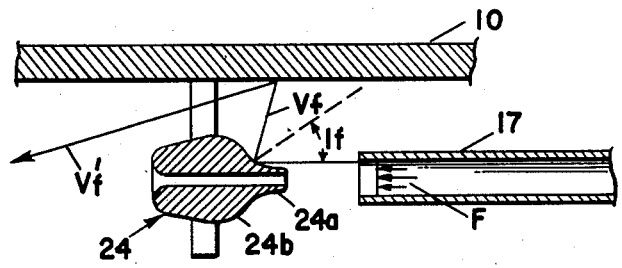
FIG.4.
INVENTOR.
ROBERT L. LIEBERMAN
BY Elliott & Pastoriza
ATTORNEYS :::
United States Patent Office 3,150,689
Patented Sept. 29, 1964

3,150,689
FLUID PULSATION DAMPENING APPARATUS
Robert L. Lieberman, Los Angeles, Calif., assignor to Auto-Control Laboratories, Inc., a corporation of California
Filed June 18, 1963, Ser. No. 288,824
4 Claims. (Cl. 138—26)

This invention generally relates to a fluid pulsation dampening apparatus, and more particularly concerns pulsation dampening equipment designed to attenuate and dampen pulsations occurring in fluid lines, for example, resulting from piston type pump pulsations and the like.

There are several different types of pulsation dampeners available for this type of application. Many of the more conventional pulsation dampeners include moving parts or components which may be subject to deterioration and expensive maintenance.

In consequence, one of the objects of the present invention is to provide an improved fluid pulsation dampening apparatus, in which pump pulsations and equivalent pulsations in a fluid line are reduced to a small fraction of their original magnitude.

Another object of the present invention is to provide an improved pulsation dampening apparatus which does not embody any moving parts and which does not embody an flexible seals or other members which need be maintained and periodically replaced.

A further object of this invention is to provide an improved pulsation dampening apparatus which may be used satisfactorily with varying pump speeds or pump piston frequencies, as well as a fluid pulsation dampening apparatus which is susceptible of satisfactory operation under varying working pressures and temperature conditions ranging, respectively, up to 25,000 pounds per square inch and from minus 450 degrees Fahrenheit to plus 1000 degrees Fahrenheit.

A further object of the present invention is to provide an improved pulsation dampening apparatus which will operate satisfactorily under all flow rates.

A still further object of the present invention is to provide an improved pulsation dampening apparatus which may be economically constructed in a rugged design with a minimum number of parts and with virtually no maintenance being required.

These and other objects and advantages of the present invention are generally achieved by providing a fluid pulsation dampening apparatus comprising an elongated closed casing provided with an inlet opening at one end and an outlet opening at the opposite end; an axially extending conduit communicates with the inlet opening and is supported from one end of the casing. The conduit has its free end disposed within the casing.

As a feature of the present invention, a deflector is rigidly supported within the casing in spaced relationship from the end of the conduit. The deflector has outer sidewalls facing the conduit and a passage extends axially through the deflector in alignment with the conduit. Preferably, the passage is appreciably smaller in diameter than the conduit so as to cause a part of the fluid entering the apparatus to engage the outer sidewalls of the deflector.

In this regard, the outer sidewalls of the deflector facing the free end of the conduit are characterized by an increasing diameter and correspondingly increasing slope relative to the axis of the apparatus in a direction away from the free end of the conduit. As a consequence, the part of the fluid impacting against the outer sidewalls will have an angle of incidence inversely proportional to the distance of the point of impact from the free end and correspondingly from the axis of the apparatus.

The importance of this angle of incidence will become more apparent as the specification proceeds. Suffice it to say at this point that the angle of incidence causes certain delays in the flow rate of that portion of the fluid flow which is not passing through the passage of the deflector. This delay characteristic will vary according to the flow rate of the fluid being pumped through the unit; this diverted portion will, in turn, have a different effect upon the main path of flow that it subsequently joins before leaving the unit. This feature of the present invention, as heretofore mentioned, will become clearer as the specification proceeds.

Referring now to the drawings, disclosing merely one illustrated embodiment, it will be seen that:

FIGURE 1 illustrates a fluid pulsation dampening apparatus, in accordance with the present invention, showing one embodiment thereof in sectional view;

FIGURE 2 is a cross-section of the fluid pulsation dampening apparatus of FIGURE 1 taken in the direction of the arrows 2—2;

FIGURE 3 is an enlarged view of the encircled portion 3–4 of FIGURE 1 disclosing schematically certain features of fluid flow under slow or low velocity conditions; and, FIGURE 4 is another view of the encircled portion 3–4 of FIGURE 1 illustrating certain features of the fluid flow under high or fast velocity conditions.

Referring now to FIGURE 1, there is shown a section of a fluid pulsation dampener including a cylindrical casing 10. The casing 10 is closed off at its left-hand end (as viewed in FIGURE 1) with an end connector 11 welded to the casing 10 at 12. Similarly, the right-hand end (as viewed in FIGURE 1) is closed off with an end connector 13 welded at 14, to the casing 10. The connector 13 is provided with internal threading 15; and in the same manner, the connector 11 is provided with internal threading 16. Thus, the connectors 15 and 16 may be appropriately coupled to an inlet and outlet line, respectively.

The connector 15 has extending axially therefrom a conduit 17 which may be welded at 18 to the inner end surface 19 of the connector 15. The conduit 17 merely serves the function of directing fluid coming through the inlet end member or connector 15 to a position where it will engage a deflector member 20.

The deflector member 20 forms an important feature of the present invention in that it serves the function of dampening out pulsations over an extensive range of fluid flow rates. It will, thus, be described in some detail. The deflector member 20 is rigidly held in position within the casing 10 by a plurality of struts 21 which may be welded, as at 22, to the inner sidewalls of the casing 10. In the illustrative form shown, (see FIGURE 2), the struts are placed approximately 120 degrees apart to secure the deflector 20 within the center of the casing.

The deflector 20 has extending axially therethrough a passage 23 which is in alignment with the conduit 17.

It is preferred that the passage 23 be approximately one-half the cross-sectional area of the interior of the conduit 17; however, it has been found that this dimension may vary considerably without adversely effecting operation of the unit. It is important, however, that the passage 23 at least be smaller than the passage or conduit 17. By having the passage 23 smaller than the conduit 17, it will be appreciated that only part of the flow being discharged from the free end of the conduit 17 will pass through the passage 23, while another part of the flow volume coming therefrom will engage the sidewalls of the deflector 20.

Thus, referring to the views of FIGURES 3 and 4, the deflector sidewalls are indicated by the numeral 24. The deflector sidewalls include a portion 24a closest to the free end of the conduit 17, and another portion 24b somewhat removed (integral with the portion 24a) from the free end of the conduit 17. Generally speaking, the portion 24a has a relatively slight or small slope relative to the axis of the apparatus, while the portion 24b is defined by an increased or relatively greater slope with respect to the axis of the apparatus. Of course, even with respect to the portion 24a and the portion 24b, the slope will vary. No exact curve has been established for the slopes; however, the drawing is relatively accurate in this respect. The slopes and curvature may vary considerably so long as the feature is maintained in which the slope is relatively small at points close to the axis and located close to the free end of the conduit 17, and wherein it is relatively large at points spaced from the axis and at points removed from the free end of the conduit 17. It is believed that the explanation of the usefulness of the change in the slope of the outer sidewalls of the deflector may be best explained by considering the operation of the unit with respect to the views of FIGURES 3 and 4.

Normally, in operation, the apparatus will be connected in series with a fluid line with an inlet pipe or connection being made to the threaded portion 15 of the connector 13 and similarly an outlet pipe being connected to the threaded portion 16 of the outlet connector 11. Usually, the pulsation dampener will be in a fluid line connected to a pump or other hydraulic equipment tending to produce undesirable pulsations which may cause valve chatter, high noise levels, vibration, and the like.

Assuming that the pump produces a relatively slow or low flow rate, the wave front "S" may have an appearance as schematically indicated in FIGURE 3 within the conduit 17. Thus, a high proportion of the fluid will be disposed within the center of the conduit 17 and so to speak "out front," whereby the fluid that does not pass directly through the passage 23 will tend to impact the outer sidewalls of the deflector 20 at points proximate the passage 23 or at the sidewall portions 24a. Since the sidewall portion 24a has a relatively low slope, the fluid will reflect or rebound obliquely from the sidewalls 24a, as indicated by the line "$V_s$," to impact the sidewalls of the casing and rebound at "$V_s'$" back into the main path of flow passing through the passage 23. With such a condition, the angle of incidence, as indicated by "$I_s$" is relatively large such that the distance the fluid must travel (that is, the part of the fluid that does not pass through the passage 23) is relatively speaking somewhat shorter than when the angle of incidence is smaller.

Thus, looking at the view of FIGURE 4, it will be seen that under conditions when the velocity flow is higher or faster, the wave front, as indicated by "F" in the conduit 17 is disposed across the entire conduit with a relatively straight line type flow. Thus, a greater proportion of the fluid leaving the conduit 17 will be spaced further away from the axis of the apparatus such that this portion of the fluid will tend to impact the deflector 20 at the outer wall portion 24b whereby the path of flow will be as indicated by "$V_f$" and "$V_f'$." Similarly, the angle of incidence, "$I_f$" will be somewhat smaller. It will be seen in the flow conditions of FIGURE 4 that the diverted flow travel will be correspondingly longer because of the lower or smaller angle of incidence which, in turn, is dependent upon the higher slope in the portion 24b of the sidewalls of the deflector 20.

With the above in mind, the function of the deflector 20 may be more readily appreciated. The purpose of the deflector 20 is to divert a part of the fluid from the main stream of flow and then bring it back into the stream one-half cycle later so as to endeavor to cancel out the pulsations. By using a change in slope as indicated at lower velocities, when a smaller proportion of the fluid is flowing adjacent to the conduit sidewalls, the fluid must be brought back into the main line quicker in order to achieve a proper dampening effect. On the other hand, when a higher proportion of the fluid is adjacent to the sidewalls of the conduit 17, for example, as in FIGURE 4, then the travel of the fluid should be somewhat extended to compensate for the difference in the volume of fluid flow passing through the passage 23.

In order to further assure a smoothing out of any fluid turbulence, a "hat" shaped supplemental deflector 25 may be employed adjacent the outlet connector 16. The deflector 25 is, of course, provided with circumferentially spaced side openings (not shown) to permit the passage of the fluid. The deflector 25 although of some value is not a part of the present invention.

It will be appreciated, however, although the above described construction will generally achieve proper pulsation dampening, that precise dampening of particular frequencies must be averaged out. With such a construction, it has been found that dampening can be approached that brings the pulsations down to approximately one percent of the pressure wave magnitudes without the use of the pulsation dampener.

It will be appreciated, however, that a variety of minor changes and modifications may be made in the pulsation dampening apparatus of the present invention without departing from the spirit and scope of the invention. For example, the curvatures of the deflector may vary somewhat without departing from the principle of using a higher degree of slope at points further radially removed from the axis of the apparatus. Also, the manner of supporting the deflector, the manner of retaining the end members, and the like, may vary to suit particular structural needs. These and other features are deemed to be covered by the claims that hereafter follow.

What is claimed is:

1. A fluid pulsation dampening apparatus, comprising: an elongated closed casing provided with an inlet opening at one end and an outlet opening at the opposite end; an axially extending conduit communicating with said inlet opening and supported from said one end of said casing; said conduit having its free end within said casing; a deflector rigidly supported within said casing in spaced relationship from said free end, said deflector having outer sidewalls facing said conduit and a passage extending axially therethrough in alignment with said conduit, said passage being of smaller diameter than said conduit so as to cause a part of the fluid to engage said outer sidewalls, said outer sidewalls being characterized by an increasing diameter and correspondingly increasing slope relative to the axis of said apparatus in a direction away from said free end, whereby said part of said fluid impacting against said outer sidewalls will have an angle of incidence inversely proportional to the distance of the point of impact from said free end and correspondingly from the axis of said apparatus.

2. A fluid pulsation dampening apparatus, according to claim 1, in which the cross-sectional area of said passage is approximately one-half the internal cross-sectional area of said conduit.

3. In a fluid line, means for dampening pulsations in the fluid flow therethrough, said means comprising: deflector means supported axially within said line, said deflector means having outer sidewalls positioned to be engaged by a portion of said fluid flow and said deflector means defining an axially extending passage for receiving the remainder of said flow, said sidewalls causing said portion of said flow to be angle off to engage the interior sidewalls of said line and thereafter rejoin said remainder of said flow after the latter has passed through said passage, whereby said portion and said remainder of said flow will have a different pulsation cycle relation tending to dampen the pressure pulsations characterizing said fluid flow.

4. The subject matter, according to claim 3, in which said outer sidewalls are characterized by an increasing slope and increasing diameter in the direction of fluid flow.

References Cited in the file of this patent

UNITED STATES PATENTS

| | | |
|---|---|---|
| 2,631,614 | Stephens | Mar. 17, 1953 |
| 2,707,033 | Moerke et al. | Apr. 26, 1955 |
| 2,877,800 | Mortimer | Mar. 17, 1959 |
| 2,904,076 | Engel et al. | Sept. 15, 1959 |
| 2,943,641 | Arnold | July 5, 1960 |
| 3,018,799 | Volkmann et al. | Jan. 30, 1962 |